Dec. 30, 1924.

J. F. CULLEN 1,520,858

FABRIC HANDLING MACHINE

Filed Oct. 9, 1922

INVENTOR
JULIEN F. CULLEN
BY: R.H.Waters
ATTORNEY

Dec. 30, 1924. 1,520,858
J. F. CULLEN
FABRIC HANDLING MACHINE
Filed Oct. 9, 1922 4 Sheets-Sheet 3

INVENTOR
JULIEN F. CULLEN
BY: *[signature]*
ATTORNEY

Dec. 30, 1924. 1,520,858
J. F. CULLEN
FABRIC HANDLING MACHINE
Filed Oct. 9, 1922    4 Sheets-Sheet 4
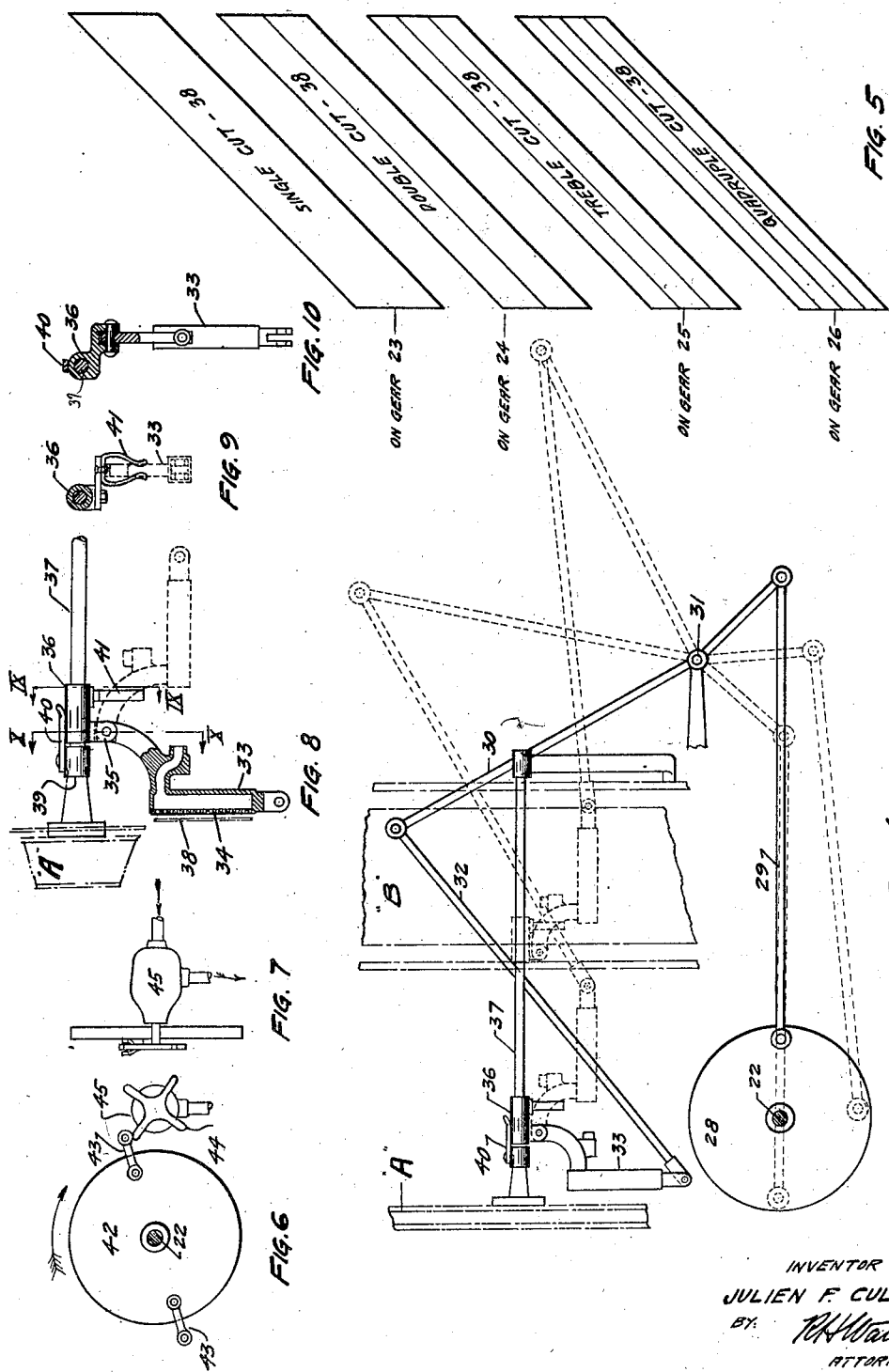

Patented Dec. 30, 1924.

1,520,858

UNITED STATES PATENT OFFICE.

JULIEN F. CULLEN, OF PORTLAND, OREGON, ASSIGNOR TO KELLY-SPRINGFIELD TIRE COMPANY, OF CUMBERLAND, MARYLAND, A CORPORATION OF NEW JERSEY.

FABRIC-HANDLING MACHINE.

Application filed October 9, 1922. Serial No. 593,388.

*To all whom it may concern:*

Be it known that I, JULIEN F. CULLEN, a citizen of the United States, residing at Portland, in the county of Multnomah and State of Oregon, have invented certain new and useful Improvements in a Fabric-Handling Machine, of which the following is a specification.

This invention relates to a device for automatically handling strips of material previously operated upon by a cutting machine whereby the severed articles are transported to a different machine which performs a further operation upon them.

Although the invention is adapted to the handling of a great variety of material, in associated combination with many commercial devices for the accomplishment of analogous operations, the preferred embodiment illustrates a specific application to the handling of bias-cut textile material more usually associated with the well known practices followed in the art of pneumatic tire manufacture.

Without limitation to other analogous combination uses, the invention has been illustrated in operable and true combination with a cutting machine adapted to prepare plies of textile material for incorporation into tire casings and a machine for spooling or winding-up the previously cut plies in a form for convenient handling in subsequent operations. The cutting machine illustrated being the subject of Letters Patent No. 942,164, dated December 7, 1909, and the wind-up machine being the subject of Letters Patent No. 1,418,365, dated June 6, 1922; the specified machines being identified by the characters "A and B", respectively, on the drawings, in the order referred to.

The universal practice, previously followed, in transporting the severed plies from the cutting machine to the wind-up machine implies merely manual handling of the plies, which must be picked off from the cutter by two operatives trained for the purpose, and necessarily dexterous, and who must lay the "tacky" surfaced strips in a smooth and orderly manner upon the constantly moving conveyor cloth on the wind-up machine. This crude method is necessarily wasteful of time, and inefficient, as, with fatigue, and the continued strain on human effort, the operatives become indifferent, and indeed physically unable to keep pace with the normal output of the cutter. In addition to the element of human error and fatigue, as lowering the efficiency of the operation, there is always the danger of operatives suffering finger mutilation by their careless approach to the quick-running knife edge of the cutter.

In full recognition of the above obstacles to manually handling the material, it has become the object of this invention to provide means for economically and automatically picking off the severed plies from the cutter and depositing them at a uniform rate and in an efficient manner upon a second transporting appliance.

An additional object is to relate the combined operation of the invented device with the respective functions of the cutter and wind-up by the use of new and novel associated mechanisms, all as more fully described herein, illustrated in the drawings, and specifically set forth in the appended claims.

Fig. 4, is a diagram of one set of the air shutter operating mechanism looking in the direction of arrow IV, from the left side of the assembly of Fig. 2. (The second, independent, set of air shutter gear being identical with that shown.)

Fig. 5, is a series of diagrammatic views of different cutting combinations possible to effect on machine "A" to one pick-off operation.

Fig. 6, is an end view of the valve gear for regulating the air suction and cut-off on the pick-off head.

Fig. 7, is a front view of Fig. 6.

Fig. 8, is a partial view of the pick-off head, in position to receive a cut-off ply from "A", and showing its several special features.

Fig. 9, is a section through IX—IX of Fig. 8, showing the spring latch to hold the head in a horizontal position.

Fig. 10, is a section through X—X of Fig. 8, showing a further detail of the head.

Figure 2:
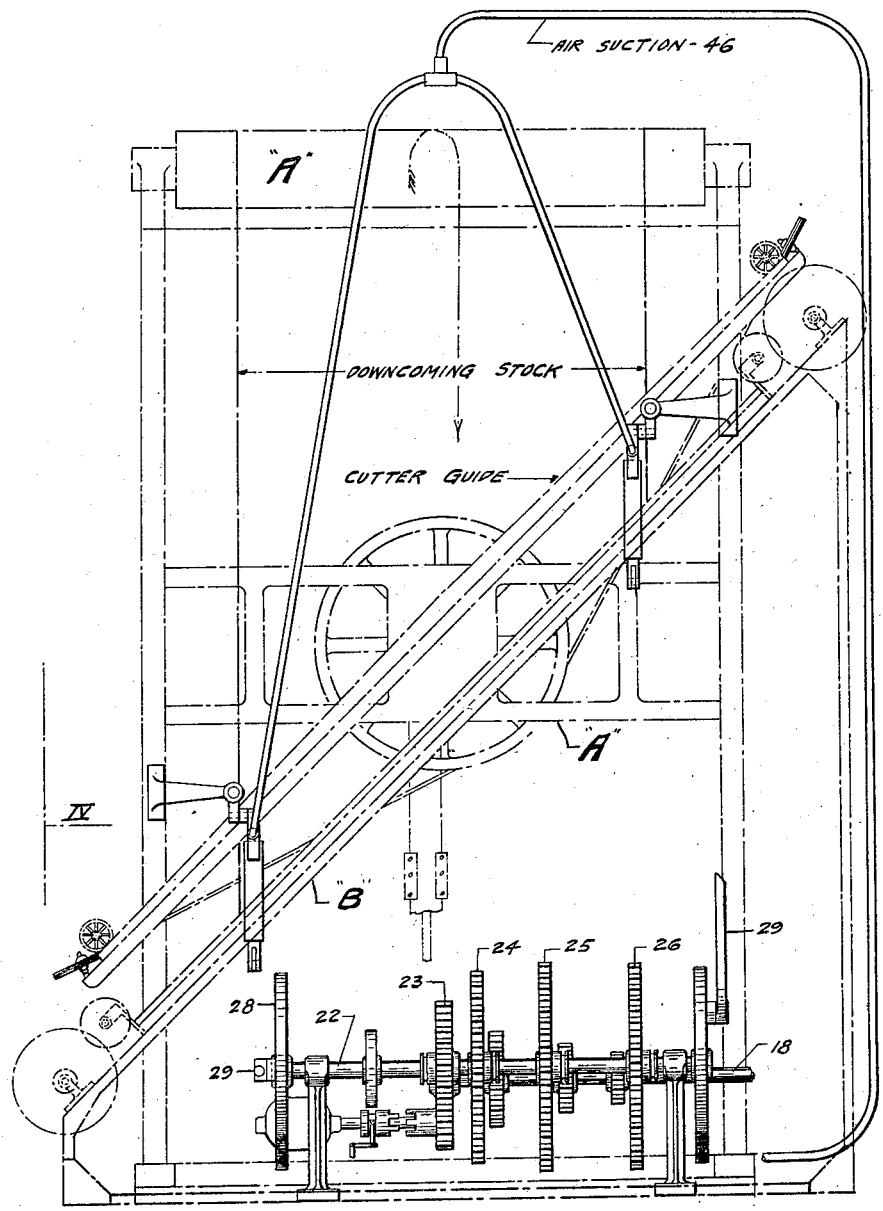
Fig. 2, is an elevation, approximately in the plane II—II, of Fig. 1, looking toward the cutter "A", and drawn partially in diagram.

Before describing the mechanical features in detail, and to call particular attention to an important refinement of control on this invention attention is called to Fig. 5, wherein a series of stock cutting combinations possible to effect on cutter "A," selectively, to one operation or cycle of the pick-off head, is shown. To understand this method of cutting more than one strip on cutter "A" before picking-off, it is necessary to note that the reciprocating cutter blade of A, that traverses the cutter guide (see Fig. 2), may be set with great precision to barely penetrate the thickness of the gummy tire stock, whereby the almost completely severed strip will yet adhere along its abutting edge to the downcoming length of uncut material. Now, although one or several plies, thus almost severed, will hang of their own adhesion to the suspending material, a very slight additional pull or a sharp light jerk will separate them from the uncut remainder. Noting this fact, it becomes obvious that the pick-off head need not operate until the total width of the severed stock, whether it be one or many plies of stock, equals the capacity width of the suction pick-off portion of the said head. In practice, it has been found that the width of plies varies greatly as influenced by the use they are to be put to in the tire casing. For instance, a relatively wide ply, perhaps as wide as eighteen inches, or more, is required for a main building ply; whereas, in cutting such narrow strips as chafing strips, bead binder and the like, relatively and varyingly narrower strips are specified.

As it is usual to set the cutting width of the plies by special adjustmens on the patented cutter "A," (a matter not requiring special discussion in this specification) and to perhaps run off a whole roll of material to that cut before making a change in width for material for some other use, it will be appreciated that the pick-off operation should be regulated to most effectively accommodate the output of cutter "A" with the least number of cycles or strokes.

Figure 3:
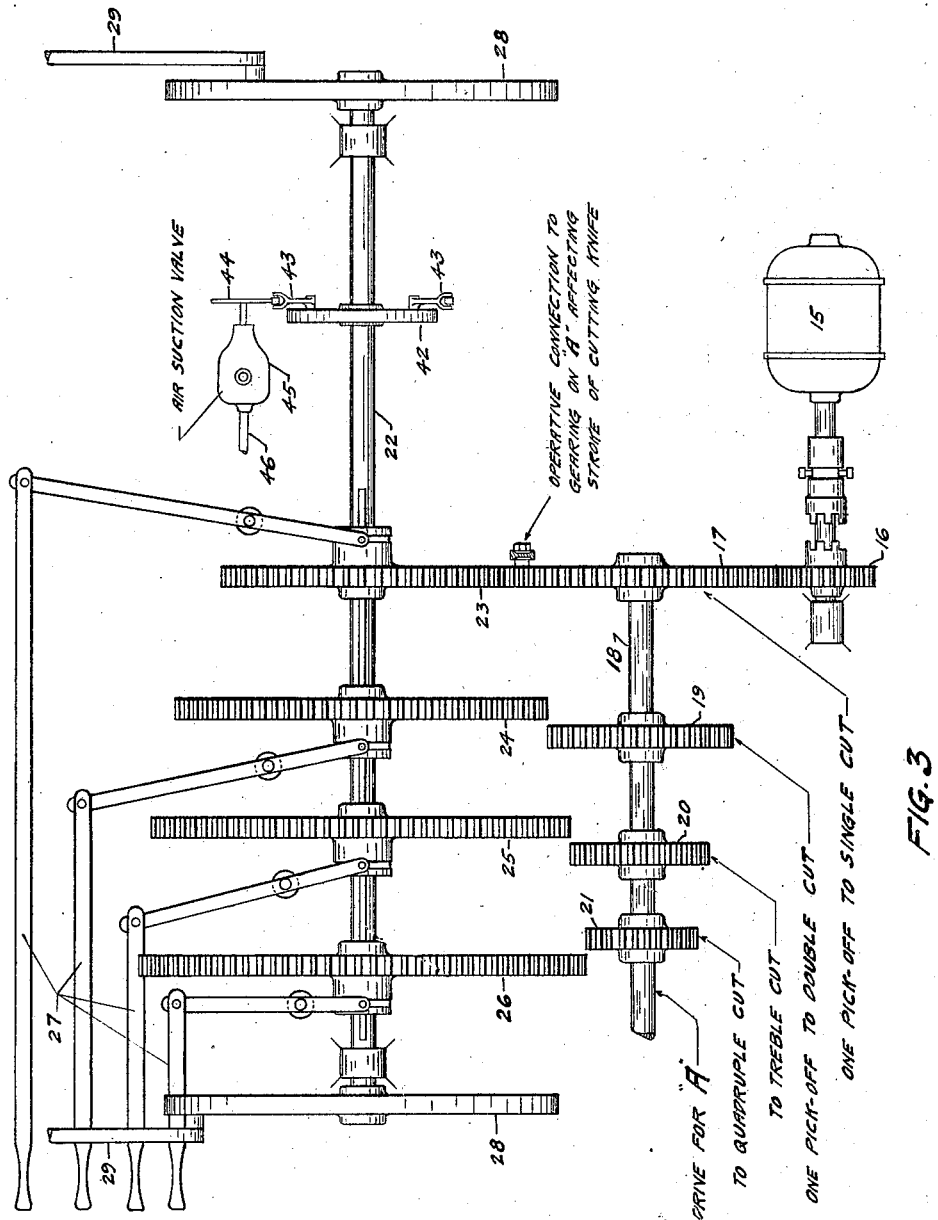
Fig. 3, is a diagram of the driving mechanism and the selective gearing for operating the pick-off, taken approximately in the plane III—III of Fig. 1.

To attain the desired minimum number of cycles of the pick-off head, means have been provided by the selective gearing shown in Fig. 3, whereby the operating cycle of the pick-off can be adjusted to accommodate a unitary removal of any reasonable number of severed but adhering plies. For instance, if quadruple cutting were desired (see Fig. 5), the proper selective gear, (see Fig. 3) would be clutched-in, and the stock would be duly picked off in strips of four adhering cuttings by a single cycle of the pick-off head.

It is also understood that the driving members of the selective gear arrangement for the pick off are mounted on the shaft line that operates the gearing to the reciprocating knife of the device "A," (a full understanding of which may be had by consulting Patent #942,164, the same not being a necessary element of these specifications and drawings), whereby the timing of the knife reciprocation is related accurately to the operating cycle of the pick off. In other words, in the specific disclosure, the cycle of pick-off varies from one to one to one to four as regards the full severance stroke of the knife, as determined by the precise selective gear chosen.

Referring specifically to the drawings, "A" represents a standard fabric cutting machine made in general accordance with U. S. Pat. #942,164, and, in Fig. 2, the downcoming width of fabric, which is to be cut into plies by a reciprocating knife housed within the cutter guide, is indicated. Located close to the face of the "cutter A" is a wind-up table "B" made in accordance with U. S. Pat. #1,418,365, and characterized by a continuously moving fabric liner which is wound up on a spool as strips of tacky tire carcass fabric are deposited upon its exposed surface. Suitably located between machines "A" and "B," and associated with them, and operated in synchrony with "A," is the device for picking off the severed fabric plies from below the cutter blade of "A" and transferring them onto the face of the moving liner of "B" (see Figs. 1 and 2).

The same source of power, motor 15, drives a pinion 16 meshing with spur gear 17 fast on the end of a shaft 18. The shaft 18 is the source of primary drive (means not shown) of the operative mechanism, including the knife, of cutting machine "A." Keyed to shaft 18 are three additional gears 19, 20 and 21 of different diameters (see Fig. 3). A counter shaft 22 is associated with the rotation of shaft 18 by either of four gears 23, 24, 25 or 26, each slidably keyed to 22 and selectively engageable with their complemental gears 17, 19, 20 and 21 on shaft 18, whereby variable relative speeds of shafts 22 and 18 are attained by operation of the shift levers, generally indicated as 27. (The purpose of this relative selective speed has previously been explained and will be more fully referred to hereafter.)

Referring especially to Figs. 1, 2, 3 and 4, the operation of the pick-off mechanism will be described, generally. The pick-off comprises duplicate heads with identical duplicate mechanical controls; therefore similar numerals of reference are used to denote like parts, and the description of one applies to both. At the extremities of shaft 22 are fly wheels 28 on which connecting rods 29 are mounted, conventionally. Rods 29 are connected to the shorter arm of a modified bell crank lever 30 which is fulcrumed at 31 on a bracket attached to the device "B". The end of the longer arm of 30 is suitably journaled to a second connecting rod 32, which in turn is connected to the free end of the pick-off head 33. This head 33 is fashioned as an air suction device having an open grill face 34 for the admission of air to its hollow bore. (See Fig. 8.) Head 33 is hingedly affixed at 35 to a slide 36 freely movable on a guide rod 37 suitably supported at its ends on bracket attachments to "A" and "B", respectively. The hinge connection 35 is so designed that the swing of the head downward will be restricted to the vertical position to facilitate positioning favorable to picking-off the severed fabric ply 38 when the air suction operates automatically in related time with the severance strokes of the cutter knife of "A"; also, the vertical stop-swing limitations insures that the head shall be in proper relation to the ply when the rod 32 forces the slide 36 to the stop position 39 against the frictional retardation of the spring 40. The spring 40 is used to delay the return of the head 33 to its delivery position over "B" until the pull of the rod 32 has swung the head to approximately a horizontal position, best shown in broken lines on Fig. 4. As the rod 32 pulls away from "A", the head 33 will swing freely to the horizontal position while the slide 36 is still under the retarding influence of friction spring 40, and, before the slide 36 begins to move, the neck of the head will become frictionally engaged and supported horizontally in proper position for depositing its burden on "B" by a forked spring clamp 41. By the foregoing appliances, it is apparent that the head having been vertically positioned to receive the severed ply 38 and having duly drawn the ply against its face when the air suction is automatically turned on by the automatic valve will first be horizontally positioned by the back stroke of the rod 32 and so held by spring 41 until it has completed its delivery stroke. On its return for another ply the head will still maintain a horizontal position until the slide 36 encounters the retarding influence of spring 40 when the further advance of the rod 32 will overcome the suspending action of 41 and proceed to swing the head downwardly through an arc of ninety degrees. From this vertical position the head 33, being prevented from further angular accommodation by the stop hinge feature, can only advance further toward the face of "A" by causing the slide 36 to advance within the influence of the drag spring 40. All of which operation, and the advantage of which in the receiving and depositing of the material, is sufficiently obvious from the drawings to render further discussion unnecessary.

The automatic suction system for picking off and depositing plies, operates as follows: On the shaft 22 (see Figs. 3, 6 and 7) is a cam wheel 42 having valve operating rollers 43 adapted to engage and partially turn valve arms 44 on the stem of valve 45 whereby the valve is automatically opened when the head 33 is in position to pick-off the stock and create a suction which is maintained until the head is over "B", in depositing position, when the further operation of the valve, automatically breaks the suction whereby the ply 38 is dropped onto the moving conveyor and duly wound up (see Fig. 1). The air suction system pipe is generally indicated as 46.

Having so fully described the apparatus, and in view of the completeness of the drawings, only the briefest description of the operation of the entire device is appended, and that, particularly confined to the operation of the air suction system.

Figure 1:
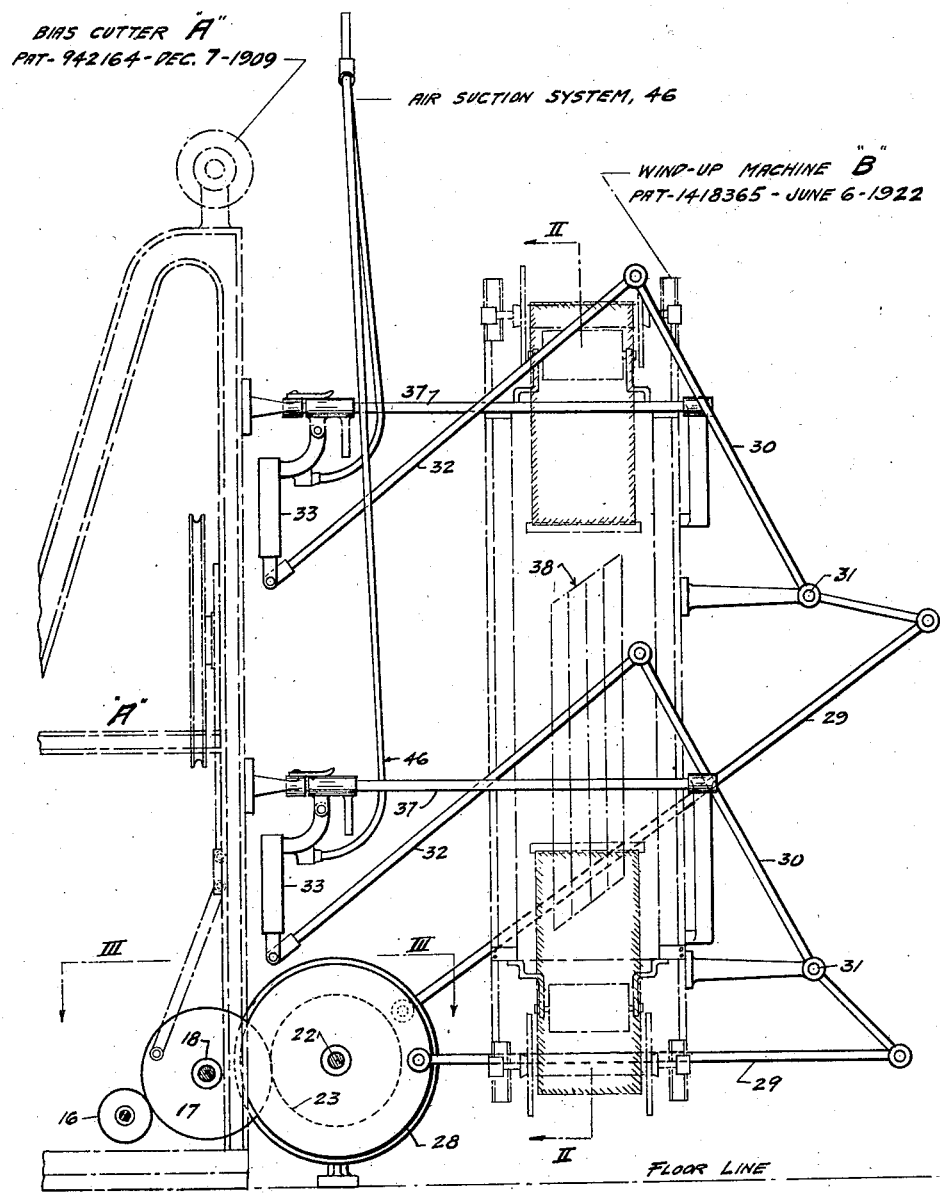
Figure 1, is an elevation of the associated combination, taken from the left side of the assembly shown in Fig. 2. (Throughout the drawings, the previously patented combined elements have, in general, been distinguished from the improvements of the present invention by the use of broken lines.)

In Fig. 1 the heads 33 are assumed to be in proper position to pick off a severed ply; it being recalled that the cycle of the pick off and timing of the air suction are positively related by the gearing described, and, in addition, the related cycle of pick-off is synchorized with the cutting off rate of the knife element of "A". Still referring to Fig. 1, we will assume that a severance of a ply, or of a multiple-adhering cutting has just been affected; as soon as the predetermined cutting stroke has been completed the suction valve opens just in advance of the retracting motion of the connecting arm 32 on the head 33. The sudden air suction "snaps" the severed ply against the two perforated faces of the duplicate heads 33 and the cycle of delivery to "B" takes place. The suction being maintained until the ply is positioned over "B". As soon as the suction is automatically broken over "B" the ply drops and the head is caused to return to its original pick-off station in time to meet the next ply severance; the air being cut off during the return stroke, as explained.

The air control valve has been illustrated in a general form only as a standard commercial article of which no novelty is claimed. The valve could be located at any convenient position in the air line and operated by many well known combinations in timed relation with the operating cycle of the pick-off head. In fact, the valve would perhaps be somewhat more effective if operated by an electrical system and solenoid in time with the aforementioned cycle; but the mechanically operated type, with or without a positive spring-jump from "open" to "close," is satisfactory.

While the preferred disclosure has particularly emphasized certain specific mechanical contrivances, and the specifications particularly described the application of their use to a certain definite class of work, it is to be understood that the above circumstances are not intended to constitute limitations on the range of departure within which the invented improvements are capable of extension within the scope of the appended claims.

What I claim is:

1. The combination with a textile ply cutting machine and a juxtaposed ply removing conveyor, of a pick-off device operably associated in timed relation with the cutter and adapted to pick-off strips from the cutter and deposit same upon the conveyor, automatically, said pick-off device having means for relating its operating cycle, selectively, to various cutting strokes of the cutting machine whereby one or more plies may be selectively removed by a single operation of the pick-off.

2. The combination with a textile ply cutting machine, of a pick-off device in operable association and timed relation with the cutting element, said pick-off comprising suction heads adapted to transport the cut plies away from the cutter and being in timed relation with the cutting mechanism whereby the pick-off cycle may be selectively varied to delay the removal of the ply from the cutter until several cuts have been made, said pick-off mechanism having associated means whereby the air suction is automatically controlled in timed relation with both cutting-off and picking-off cycles.

3. The combination with a fabric cutting device having an adjustable width of ply cut, of a ply pick-off having an operating cycle in associated timed relation with the cutting rate of the cutting device, said pick-off having means for selectively timing the related pick-off cycle to that of the ply cutting operation, said pick-off having ply-grasping means automatically rendered effective and inoperative in timed relation with the pick-off cycle, whereby at each cycle of the pick-off a ply of fabric is removed from the cutting device.

4. A fabric handling pick-off, comprising driving means whereby the cycle of operation may be selectively varied, pick-off heads consisting of air suction elements associated with an exhaust air system, means in the air system in timed relation with the cycle operation means whereby the heads are rendered effective to grasp a ply at one stage of the cycle and inoperative to retain the grasped ply at a different stage of the cycle.

5. The combination with a power driven textile ply cutting machine, of a ply pick-off device in timed relation with the cutting stroke of said cutting machine, said pick-off device having selective gear means cooperatively engageable with the drive mechanism of said cutting machine whereby the pick-off may be rendered operable in synchronized relation with various cutting cycles of said machine.

In testimony whereof I affix my signature.

JULIEN F. CULLEN.